United States Patent [19]
Daumueller et al.

[11] Patent Number: 5,769,525
[45] Date of Patent: Jun. 23, 1998

[54] LOW/HIGH BEAM HEADLIGHT FOR VEHICLES

[75] Inventors: Hans Daumueller, Bodelshausen; Karl-Otto Dobler, Reutlingen; Rainer Neumann, Stuttgart; Frieder Liedtke, Dettingen; Lothar Streit, Sonnenbuehl; Albert Vent, Eschweiler; Doris Boebel, Stuttgart, all of Germany

[73] Assignee: Robert Bosch GmbH, Stuttgart, Germany

[21] Appl. No.: 534,728

[22] Filed: Sep. 27, 1995

[30] Foreign Application Priority Data

Oct. 4, 1994 [DE] Germany .......................... 44 35 507.6

[51] Int. Cl.$^6$ .......................................................... B60Q 1/04
[52] U.S. Cl. .............................. 362/66; 362/255; 362/284
[58] Field of Search .............................. 362/66, 80, 282, 362/284, 285, 286, 287, 427, 428, 255

[56] References Cited

U.S. PATENT DOCUMENTS 3,953,726   4/1976   Scarritt, Sr. .............................. 362/286
4,947,078   8/1990   Rice et al. .

FOREIGN PATENT DOCUMENTS 220068   4/1987   European Pat. Off. .
842383   3/1939   France .................................... 362/285
492267   9/1939   United Kingdom ................... 362/285

Primary Examiner—Y My Quach
Attorney, Agent, or Firm—Michael J. Striker

[57] ABSTRACT

The headlight has a reflector (10) and a light source (12) which is arranged in a lamp carrier (22), which can be pivoted in relation to the reflector (10) about a horizontal axis (30) between a position for low beam and a position for high beam by means of an actuator (42). Starting from the position for low beam, the light source (12) is moved as a result of the pivoting movement about the axis (30), together with the lamp carrier (22), both in the direction of the optical axis (11) of the reflector (10) towards its vertex and also vertically downward in relation to the optical axis (11). Starting from the low beam reflected by the reflector (10) in the case of the arrangement of the light source (12) in its low beam position, the result achieved is both a concentration of the light beam reflected by the reflector (10) and an elevation of the light beam, so that an effective high beam is generated by means of which the remote region in front of the vehicle is illuminated with a high illumination intensity.

16 Claims, 8 Drawing Sheets

LOW/HIGH BEAM HEADLIGHT FOR VEHICLES

PRIOR ART

The invention is based on a low/high beam head-light for vehicles according to the generic type of claim 1.

Such a headlight is disclosed by DE Auslegeschrift 14 22 503. This headlight has a reflector and a light source which can be moved, in relation to the reflector, along the optical axis of the reflector, between a position for low beam and a position for high beam. The reflector is designed in the form of a paraboloid, the light source being located, in its position for high beam, at the focus of the reflector and being arranged, in its position for low beam, offset in relation to the focus. The light source, because of its movement only along the optical axis of the reflector, can be brought only either into a position which is optimum for the production of the low beam or into a position which is optimum for the production of the high beam, so that a compromise must be made here for one or the other position. In addition, the headlight has a movable shielding device by means of which, in its position for low beam, part of the light emitted by the light source is shielded and an upper light/dark boundary of the light beam emerging from the headlight is formed. In its position for high beam, the shielding device is arranged such that as little as possible of the light emitted by the light source is shielded by said shielding device. For moving the light source and for moving the shielding device, separate actuators are necessary, which means a complicated construction of the headlight. In the case of this headlight, in the position envisaged of the light source for low beam, a large part of the light emitted by the light source must be shielded, which light would otherwise extend above the light/dark boundary and would cause dazzling of the oncoming traffic.

ADVANTAGES OF THE INVENTION

In contrast, the low high beam headlight for vehicles according to the invention has the advantage that, as a result of the additional movement of the light source vertical to the optical axis, both an effective low beam and an effective high beam can be produced.

Advantageous refinements and developments of the headlight are specified in the dependent claims. The result of moving the light source according to claim 2 is that a concentrated high beam emerges from the headlight. The result of moving the light source according to claim 3 is that the region of high light intensity values of the high beam emitted by the headlight is elevated and hence a more intense illumination of the remote region in front of the vehicle is achieved. As a result of the design according to claim 4, the construction of the headlight is simplified, since no additional actuator is necessary for the movement of the shielding device. A simple formation of the shielding device is achieved by means of the design according to claim 5. By means of the design according to claim 11 it is ensured that the light source is located in exactly fixed positions for the production of the low beam and/or of the high beam. The elastically deformable intermediate element according to claim 12 ensures, on the one hand, contact with the stops irrespective of production tolerances and in addition guarantees contact with the stops even in the case of any vibrations occurring. In claims 15 and 16, shielding devices which are of simple construction and require only small adjusting paths between the positions for low beam and high beam are specified.

DRAWING

A plurality of exemplary embodiments of the invention are shown in the drawing and explained in more detail in the following description. FIG. 1 shows a low/high beam headlight for vehicles in a vertical longitudinal section, having an actuator for moving the light source according to a first exemplary embodiment, FIG. 2 shows a measuring screen, which is arranged in front of the headlight and is illuminated by the light beam emitted by the reflector in the low beam operating position, FIG. 3 shows the measuring screen in the case of illumination by the light beam emitted by the reflector in the high beam operating position, FIG. 4 shows the measuring screen in the case of illumination by the light beam emerging from the headlight after passage through a scattering pane, in the low beam operating position, FIG. 5 shows the measuring screen in the case of illumination by the light beam emerging from the headlight after passing through the scattering pane, in the high beam operating position, FIG. 6 shows a section of the headlight with a variant of the actuator for moving the light source and FIG. 7 shows a section of the headlight with a second exemplary embodiment of the actuator for moving the light source, FIG. 8 shows a section of the headlight according to a third exemplary embodiment with a modified shielding device in a position for low beam, FIG. 9 shows the headlight of FIG. 8 with the shielding device in a position for high beam, FIG. 10 shows a section of the headlight according to a fourth exemplary embodiment with a modified screening device in a position for low beam in the view opposite to the light exit direction and FIG. 11 shows the headlight of FIG. 10 with the shielding device in a position for high beam.

DESCRIPTION OF THE EXEMPLARY EMBODIMENTS

Figure 1:
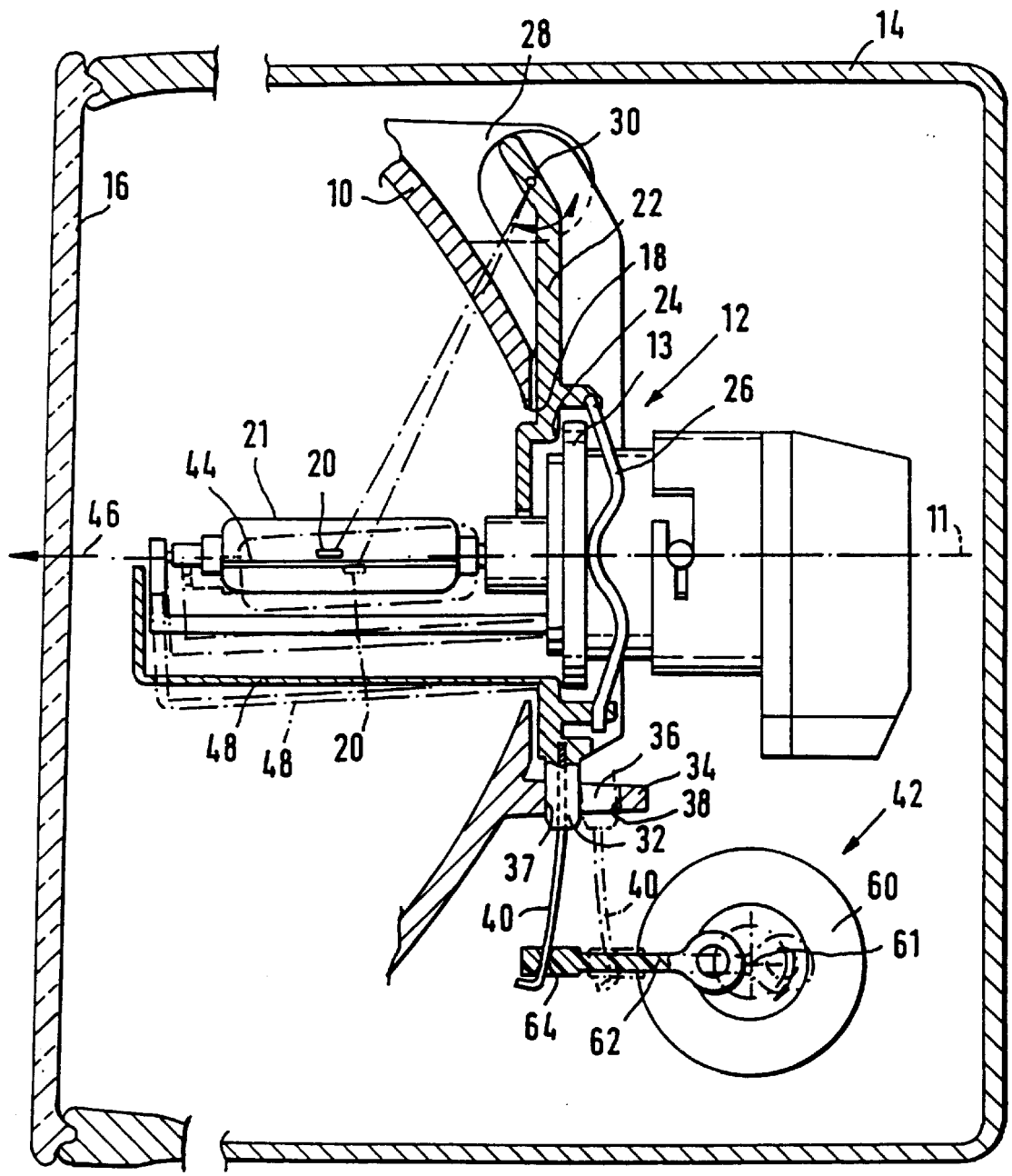

A low/high beam headlight, shown in FIG. 1, for vehicles, in particular motor vehicles, has a reflector 10 and a light source 12. The reflector is arranged displaceably in a mounting or a housing 14. The light exit opening of the housing 14 is covered by a translucent pane 16 made of plastic or glass, which can be designed as a smooth pane or can have optically active elements by means of which the light passing through is deflected. The reflector 10 can consist of plastic or metal and has in its vertex region an opening 18 through which the light source 12 projects into the reflector 10 from the rear. The light source 12 can be an incandescent lamp or a gas discharge lamp and has a luminous body 20 which is accordingly the incandescent filament or the arc and which is enclosed by an at least partially translucent covering 21 made of glass.

The light source 12 is inserted in a lamp carrier 22, which has a receiver section 24 matched to the base 13 of the light source 12 and which is fitted to the opening 18 from the rear of the reflector 10. The lamp carrier 22 can consist of metal, plastic or ceramic. The light source 12 is held in the lamp carrier 22 in a known fashion by means of an elastic fastening element 26 arranged on the lamp carrier 22, said element being able to be designed, for example, as a fastening clip made of wire. Arranged on the rear of the reflector 10, above its opening 18 are two carriers 28 with a horizontal spacing from each other, of which carriers only one can be seen in FIG. 1, which can be designed in one piece with the reflector 10 or can be fastened to the reflector 10 as separate parts. The lamp carrier 22 is supported at its upper edge region on the carriers 28 so as to be pivotable about an axis 30 extending horizontally and perpendicular with respect to the optical axis 11 of the reflector 10. On its lower edge region, opposite the pivot axis 30, the lamp carrier 22 has a tab 32. Arranged on the rear of the reflector 10, underneath the opening 18, is a bracket 34 which is designed in one piece with the reflector 10 but can also be fastened to the reflector 10 as a separate piece. The bracket 34 has a recess 36 elongated in the direction of the optical axis 11 of the reflector 10, in which recess the tab 32 of the lamp carrier 22 engages and can be moved in the recess 36 along its longitudinal extent. The recess 36 has a front edge 37, towards the reflector 10, and a rear edge 38, away from the reflector 10. Fastened to the tab 32 of the lamp carrier 22 is an elastically deformable intermediate element 40 which can be designed, for example, as a leaf spring which is fastened in a slot in the tab 32. An actuator 42, which is described in more detail below and by means of which a pivoting movement of the lamp carrier 22 about the axis 30 can be effected, engages on the free end of the intermediate element 40.

The covering 21 of the light source 12 is of approximately tube-like design and arranged on the latter are strips 44 of an opaque coating, extending laterally approximately parallel to the optical axis 11 of the reflector 10. The upper and lower circumferential region of the covering 21, arranged between the strips 44, is not covered by the coating and is translucent. In addition to the strips 44, the front end of the covering 21 pointing in the light exit direction 46 can also be covered by the coating in order to prevent light emitted by the luminous body 20 from exiting directly, that is to say without reflection at the reflector 10. Arranged in the reflector 10 below the light source 12 is an opaque cap 48 by means of which light which is emitted by the luminous body 20 of the light source 12 and exiting through the lower circumferential region of the covering 21 arranged between the strips 44 is screened, so that it cannot impinge on the reflector 10. Together with the strips 44 on the covering 21, the cap 48 forms a shielding device by means of which part of the light emitted by the luminous body 20 of the light source 12 is shielded. An upper light/dark boundary of the beam exiting from the headlight is formed by the upper edges of the strips 44. The cap 48 is rigidly connected to the lamp carrier 22, but can also be designed with the latter in one piece so that it likewise carries out the movement, effected by means of the actuator 42, of the lamp carrier 22 and of the light source 12 arranged in said lamp carrier 22. However, the covering 21 of the light source 12 can also be designed to be translucent over its entire circumference, the cap 48 then being designed such that the light/dark boundary of the low beam reflected by the reflector 10 is formed by the upper edges of said cap. In addition, the cap 48 can be omitted and the covering 21 of the light source 12 can be designed to be translucent over its entire circumference, the shape of the reflector 10 then being determined in such a way that the latter reflects light emitted by the light source 12 in its low beam position in such a manner that a beam is produced which has an upper light/dark boundary.

In a position of the lamp carrier 22 and the light source 12 arranged in the latter with its luminous body 20 for low beam, as it is shown in FIG. 1 with continuous lines, the tab 32 of the lamp carrier 22, acted on by the actuator 42, is located in contact with the front edge 37 of the recess. The luminous body 20 of the light source 12 is in this case located in an exactly fixed position in relation to the reflector 10, so that light emitted by the luminous body 20 is reflected by the reflector 10 to form a low beam. In this arrangement, the light/dark boundary of the low beam is produced by the strips 44.

Figure 2:
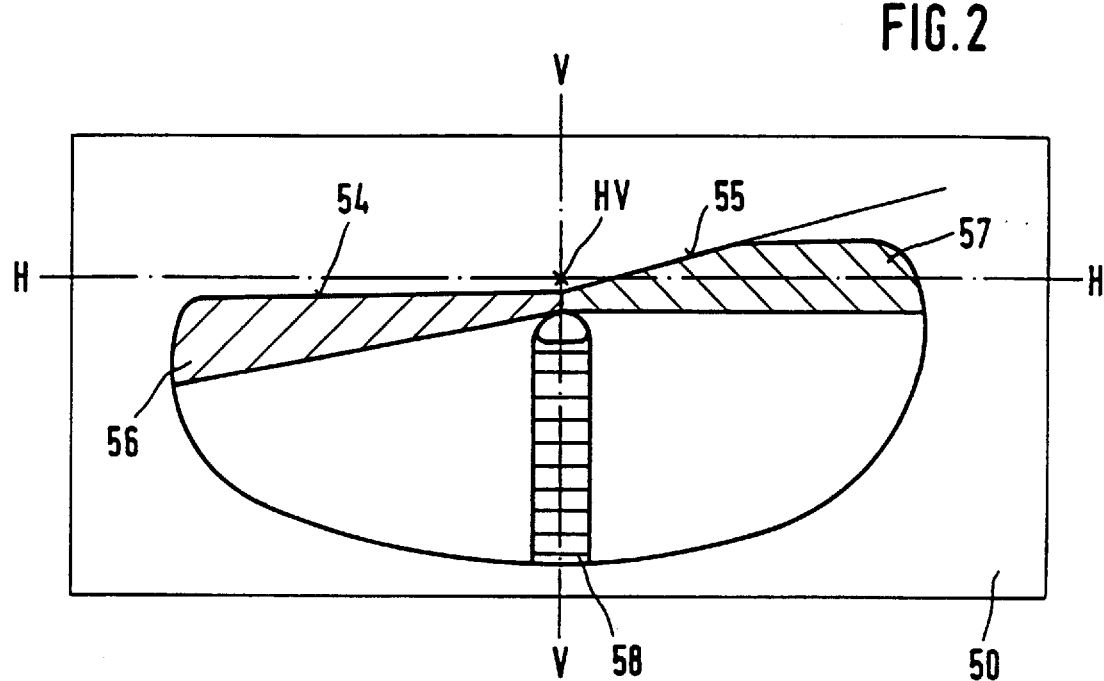
Figure 3:
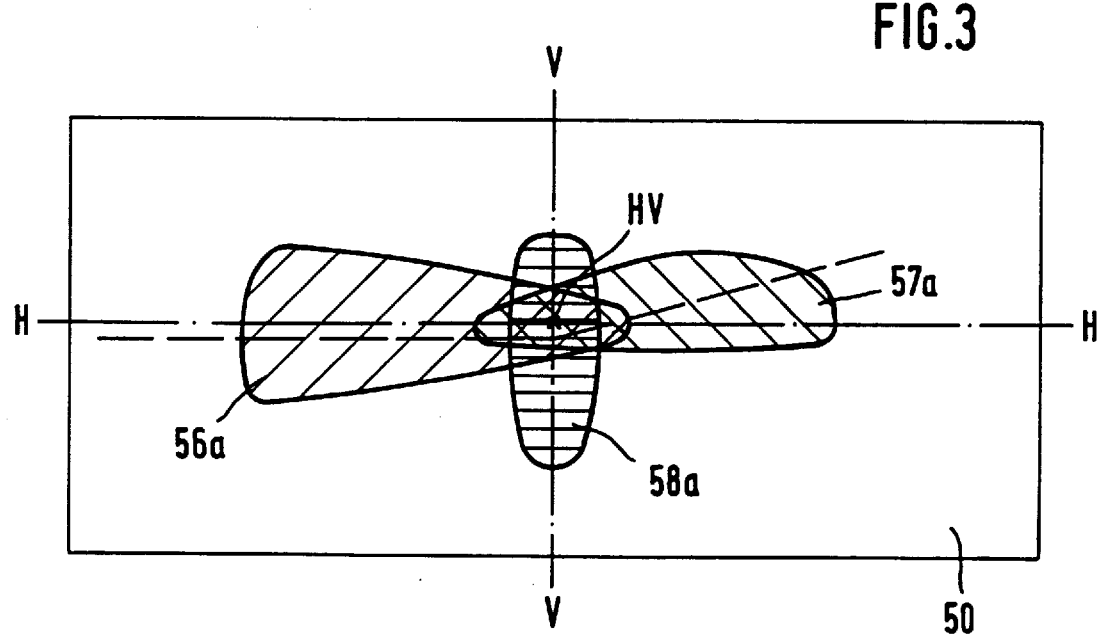
Figure 4:
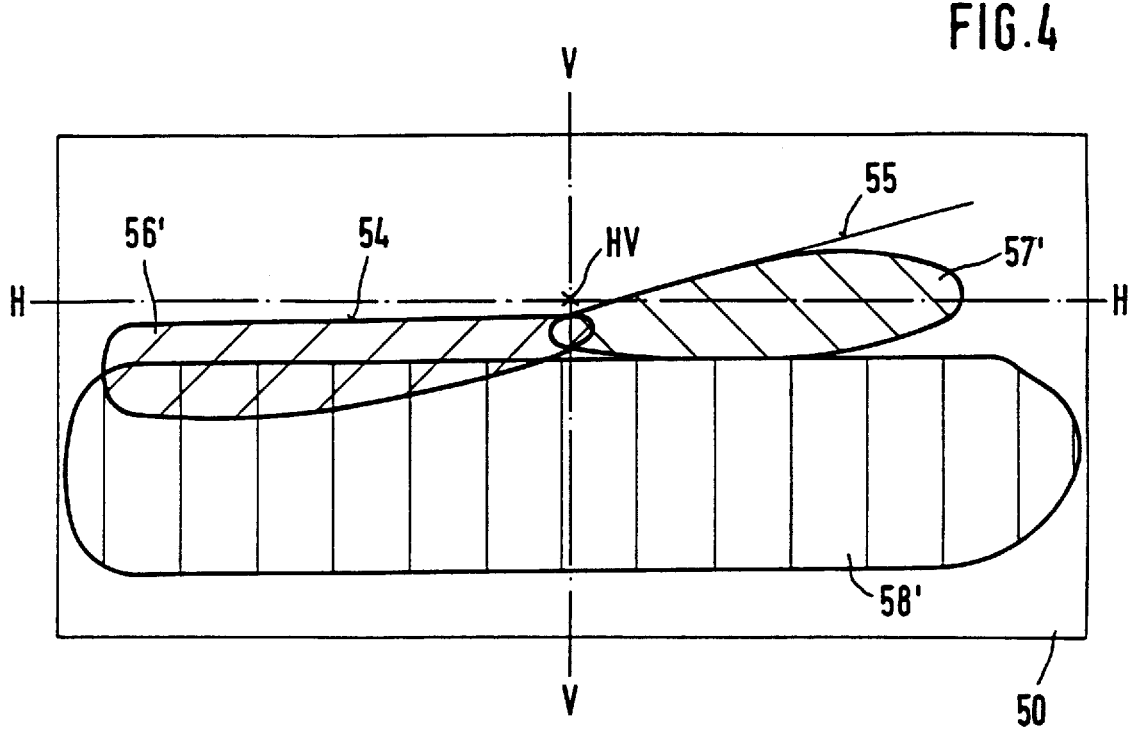

Shown in FIGS. 2 to 5 is a measuring screen 50 which is arranged in front of the headlight and represents a projection of a highway arranged in front of the headlight and which would be correspondingly illuminated during real use of the headlight. The measuring screen 50 has a horizontal central plane HH and a vertical central plane VV. In FIG. 2, the measuring screen 50 is shown in the case of illumination by the light beam reflected by the reflector 10 in the case of the light source 12 being arranged in its low beam position, without the influence of optically active elements in the covering pane 16. This light beam illuminates the measuring screen 50 in a region which is limited at the top by the light/dark boundary 54, 55. The light/dark boundary has, on the left-hand side of the measuring screen 50, that is to say on the side of oncoming traffic in the case of driving on the right, a horizontal section 54 and, on the right-hand side of the measuring screen 50, that is to say on one's own traffic side in the case of driving on the right, a section 55 rising toward the outer edge. The regions illuminated directly below the light/dark boundary 54 and 55 are designated by 56 and 57, and a region further below the light/dark boundary 54, 55 and close to the vertical central plane VV of the measuring screen is designated by 58. Shown in FIG. 4 is the measuring screen 50 in the case of illumination by the low beam emerging from the headlight after passing through the covering pane 16 and deflection by optically active elements of the covering pane 16. As a result of the optically active elements, scattering of the light beam is effected, the region 56' along the horizontal section 54 of the light/dark boundary being scattered, the region 57' along the rising section 55 of the light/dark boundary being scattered and the region 58' being scattered essentially in the horizontal direction.

Figure 5:
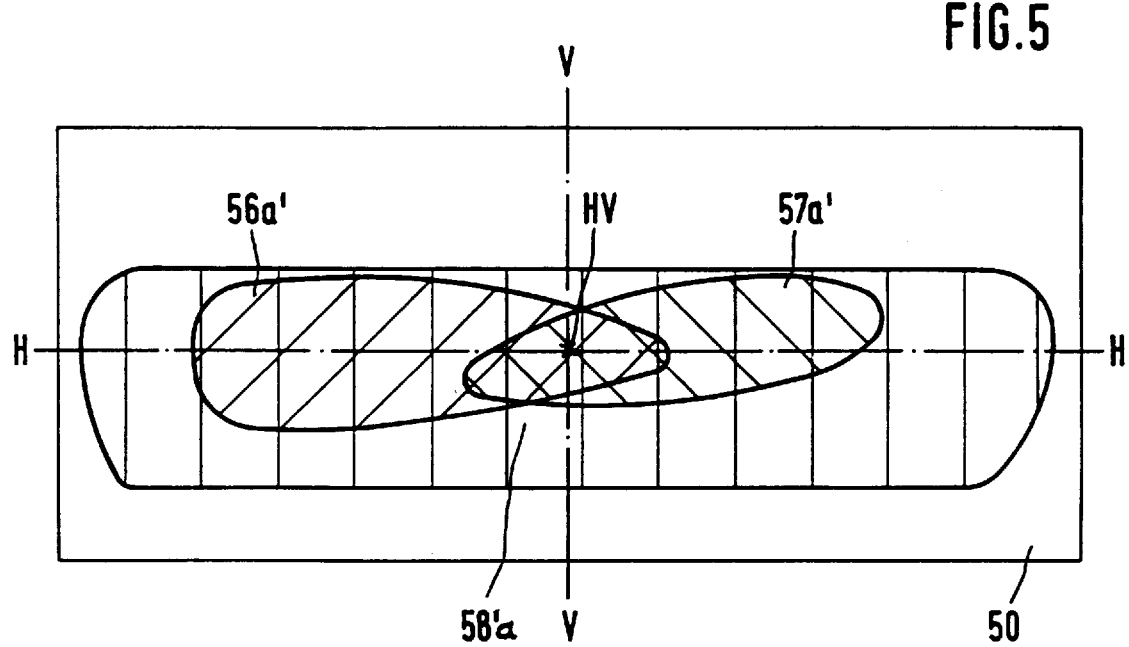

In FIG. 1, the lamp carrier 22, together with the light source 12 arranged in the latter and its luminous body 20, is shown with dashed lines in the position for high beam. In this high beam position, the tab 32 of the lamp carrier 22, acted on by the actuator 42, is located in contact with the rear edge 38 of the recess. In contrast with the position for low beam, the luminous body 20 of the light source 12 is arranged closer to the reflector vertex in the direction of the optical axis 11 and is additionally offset downward vertically in relation to the optical axis 11. In contrast with its low beam position, the cap 48 in its high beam position is likewise arranged closer to the reflector vertex in the direction of the optical axis 11 and is in addition arranged offset downward in relation to the optical axis 11. Shown in FIG. 3 is the measuring screen 50 in the case of illumination by the light beam reflected by the reflector 10 in the case of the light source 12 being arranged in its high beam position. As a result of the movement of the light source 12 in the direction of the optical axis 11, the illuminated regions 56a and 57a, in contrast with the representation in FIG. 2, are displaced toward the vertical central plane VV of the measuring screen 50 and the region 58a is displaced upward beyond the horizontal central plane HH, all the three regions 56a, 57a and 58a being partially overlaid so that, in the region of the point of intersection HV of the vertical central plane VV with the horizontal central plane HH of the measuring screen 50, high illumination intensity values are present. As a result of the movement of the light source 12 vertically downward in relation to the optical axis 11, the illuminated regions 56a, 57a and 58a are arranged vertically higher than in the case of the representation in FIG. 2 and reach beyond the horizontal central plane HH. In addition, the light/dark boundary is displaced upward because of the movement of the light source 12 and of the cap 48. Shown in FIG. 5 is the measuring screen 50 in the case of illumination by the light beam emerging from the headlight after passing through the covering pane 16 and deflection by the optically active elements. All three regions 56a', 57a', and 58a' are scattered in the horizontal direction and are arranged at least partially above the horizontal central plane HH, a concentration of the light and high illumination intensity values resulting in the remote region because of the overlaying of the regions close to the point of intersection HV.

In the case of the first exemplary embodiment of the headlight according to FIG. 1, the actuator 42 has an electric motor 60 as drive, to whose shaft there is rotatably articulated, eccentrically with respect to its axis of rotation 61, a lever 62 as transmission element, which is coupled to the intermediate element 40. The lever 62 has in its free end region an opening 64 through which the free end region of the intermediate element 40 passes. The edges of the opening 64, pointing in the direction of the optical axis 11, are designed tapering toward each other, their ends being designed to be pointed or rounded and being arranged at such a distance from each other that the intermediate element 40 is accommodated between the latter with as little gap as possible. In the case of the electric motor 60 being actuated, the lever 62 executes a movement in the direction of the optical axis 11, which movement is transmitted via the intermediate element 40 to the lamp carrier 22 and the light source 12 arranged in the latter, which execute a pivoting movement about the axis 30. In FIG. 1, the lever 62 is shown with continuous lines in the position for low beam, in which said lever is located moved to its furthest extent in the light exit direction 46. In this arrangement, the tab 32 of the lamp carrier 22 is located in contact with the front edge 37 of the recess 36, the intermediate element 40 being elastically deformed, that is to say the lever 62 is moved further in the light exit direction 46 than would be necessary for contact of the tab 32 on the edge 37. The tab 32 of the lamp carrier 22 is thus held under pretension in contact on the edge 37, so that contact is maintained even in the case of vibrations and the light source 12 is located in its position which is necessary for the production of the low beam according to the regulations. In addition, as a result of the elastically deformable intermediate element, a balancing out of measuring tolerances of the actuator 42 and of the lamp carrier 22 is possible, so that these parts do not need to be matched quite exactly to each other. In FIG. 1, the lever 62 is furthermore shown with dashed lines in the position for high beam. In this case, the lever 62 is located moved to the furthest extent opposite to the light exit direction 46 and the tab 32 of the lamp carrier 22 is located in contact with the rear edge 38 of the recess 36. The intermediate element 40 is elastically deformed also in this position, so that the tab 32 is held under pretension in contact with the rear edge 38. The electric motor 60 is actuated by the vehicle driver via a switch for switching over between low beam and high beam. The electric motor 60 can be fastened to the rear of the reflector 10 or independently of the reflector 10 in the housing 14.

Figure 6:
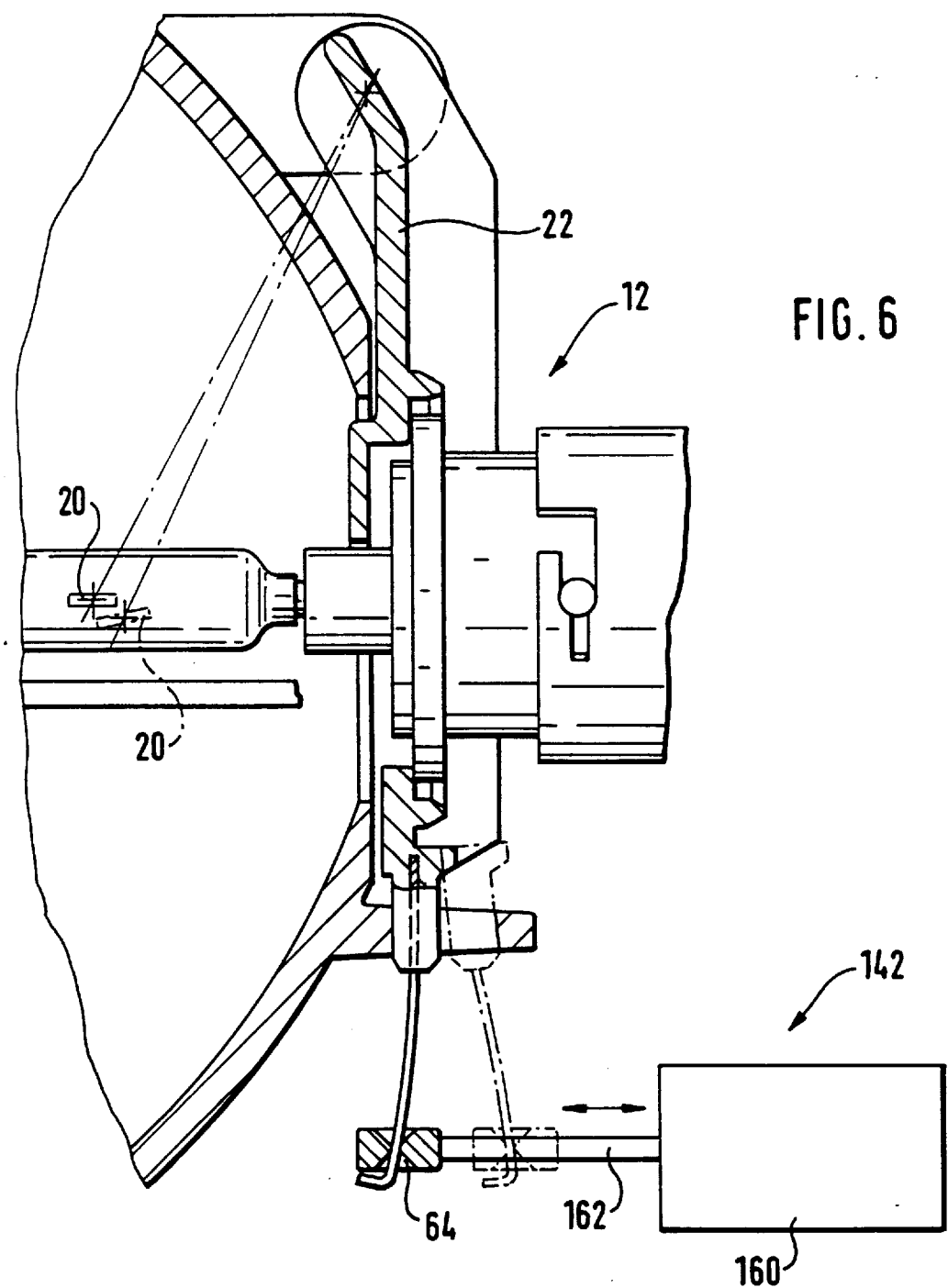

In FIG. 6, the headlight is shown by way of section with a variant of the actuator 142. In this case, the actuator 142 has a lifting rod 162 which can be moved by a drive 160 in a straight line movement. The lifting rod 162 has in its end region an opening 164 in which the intermediate element 40 is accommodated and which is designed like the opening 64 of the previously described lever 62. An electric motor, whose rotary movement is converted into a longitudinal movement of the lifting rod 162 via a thread, a gear mechanism, a link guide or a cam disk, can be provided as drive for the lifting rod 162. In addition, a hydraulic or pneumatic drive can be used, by means of which the longitudinal movement of the lifting rod 162 is effected. Finally, an electromagnet can also be used as drive, which can effect a lifting movement of the lifting rod by applying a voltage or removing a voltage. The drive can be fastened on the rear of the reflector 10 or independently of the latter in the housing 14.

Figure 7:
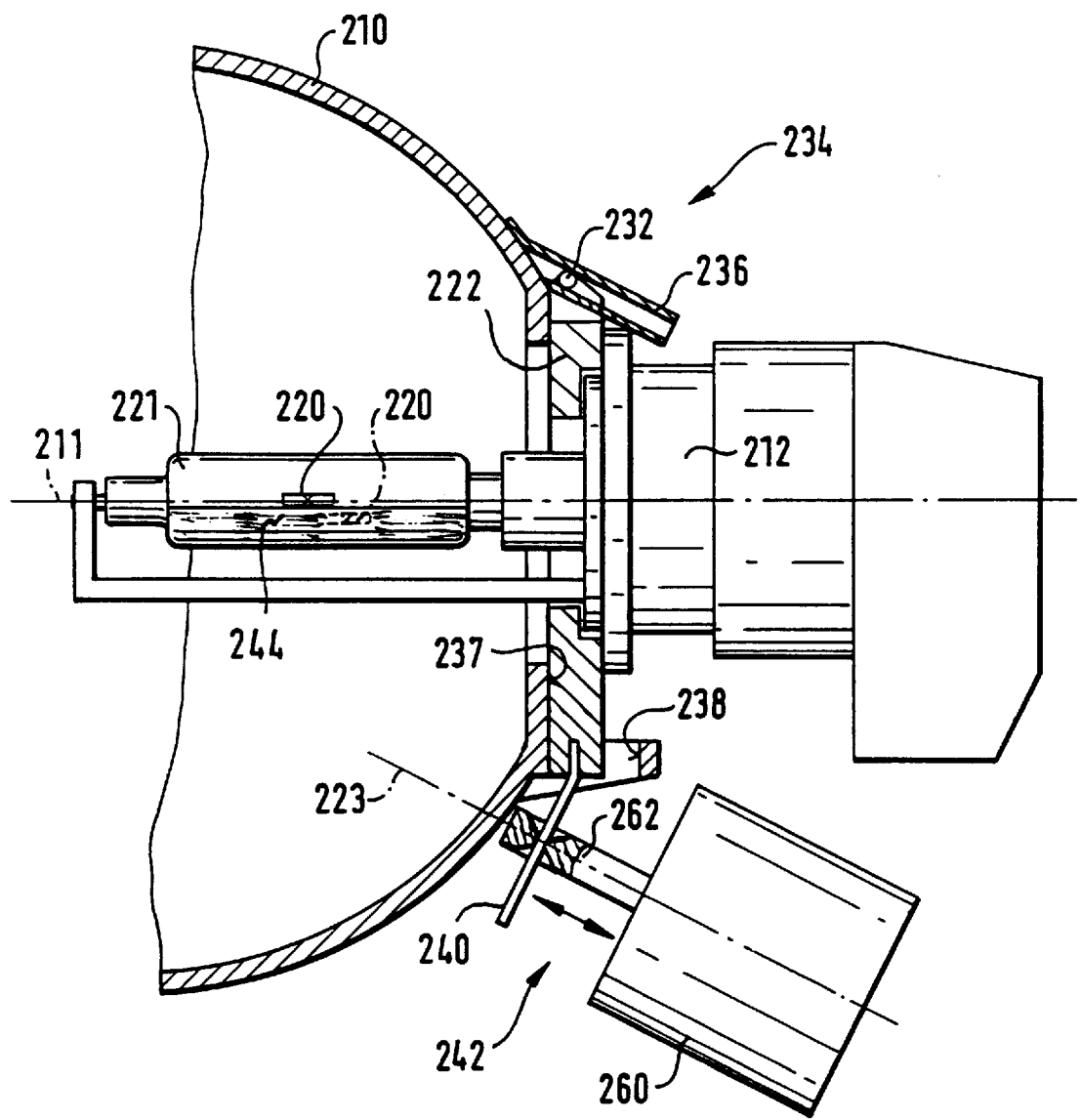

Shown in FIG. 7 is a second exemplary embodiment of the headlight, in which the headlight is of fundamentally the same design as described previously in the case of the first exemplary embodiment and in relation to which essentially only the deviating features will be described below. The light source 212 is accommodated in a lamp carrier 222 which is arranged on the rear of the reflector 210 and can be moved in relation to the reflector 210 along a straight line 223 in the direction of the double arrow shown in FIG. 7, the line 223 running inclined in relation to the optical axis 211 in the sense that its distance from the optical axis 211 increases vertically downwards towards the reflector vertex. Engaging on the lamp carrier 222 is an actuator 242 by means of which the movement of the lamp carrier 222 along the line 223 is effected. The actuator 242 can, as described in the case of the first exemplary embodiment, have an electric motor or an electromagnet as drive or a hydraulic or pneumatic drive, by means of which a lifting rod 262 is driven in a longitudinal movement which preferably engages on the lamp carrier 222 via an elastically deformable intermediate element 240. Provided for the lamp carrier 222 is a first stop 237 on which it comes to rest in the position for low beam, and a second stop 238 on which it comes to rest in the position for high beam. As in the case of the first exemplary embodiment, the positions for low beam and high beam of the lamp carrier 222 are selected such that the luminous body 220 of the light source 212, starting from the position for low beam, is located offset in the position for high beam in the direction of the optical axis 211 towards the reflector vertex and vertically downward in relation to the optical axis 211. For the lamp carrier 222, there is preferably arranged on the rear of the reflector 210 a guide 234 in which the lamp carrier 222 is guided in a straight line for the purposes of movement between the two positions. The guide 234 can, for example, be formed by at least one rail 236 in which the lamp carrier 222 engages with a protuberance 232.

The light source 212 has a covering 221 on which, in its lower circumferential region, an opaque coating 244 is applied which also covers the front end of the covering 221 pointing in the light exit direction 46. The remaining upper circumferential region of the covering 221 is designed to be translucent. The light/dark boundary of the light beam reflected by the reflector 210 is formed by the upper edges of the coating 244, as it was by the strips 44 in the case of the first exemplary embodiment. The coating 244 represents a shielding device by means of which part of the light emitted by the luminous body 220 of the light source 212 is shielded, so that it cannot impinge on the reflector 210. This design of the light source 212, as a result of which no additional cap 48, as in the case of the first exemplary embodiment, is necessary, can also be used in the case of the headlight according to the first exemplary embodiment. In addition the design of the light source 12 according to the first exemplary embodiment can also be used in the case of the headlight according to the second exemplary embodiment, the cap 48 also then being provided, and can be in one piece with the lamp carrier 222 or rigidly connected to the latter.

The light beams emitted from the headlight according to the second exemplary embodiment in the position for low beam and in the position for high beam illuminate the measuring screen 50 in the same way as shown in FIGS. 2 to 5, since the movement of the light source 212 is carried out between the same positions and only the actuator 242 is of different design.

Figure 8:
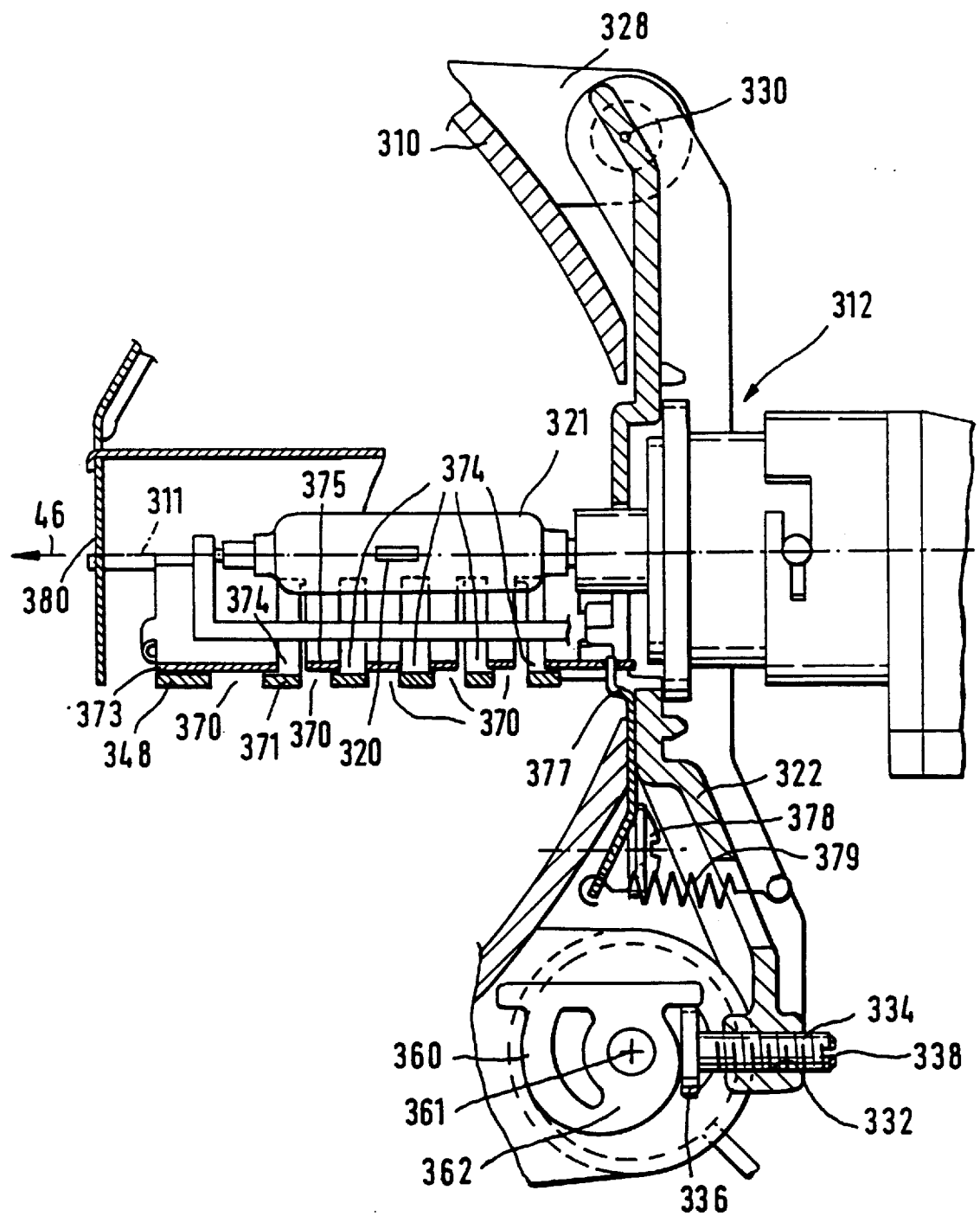
Figure 9:
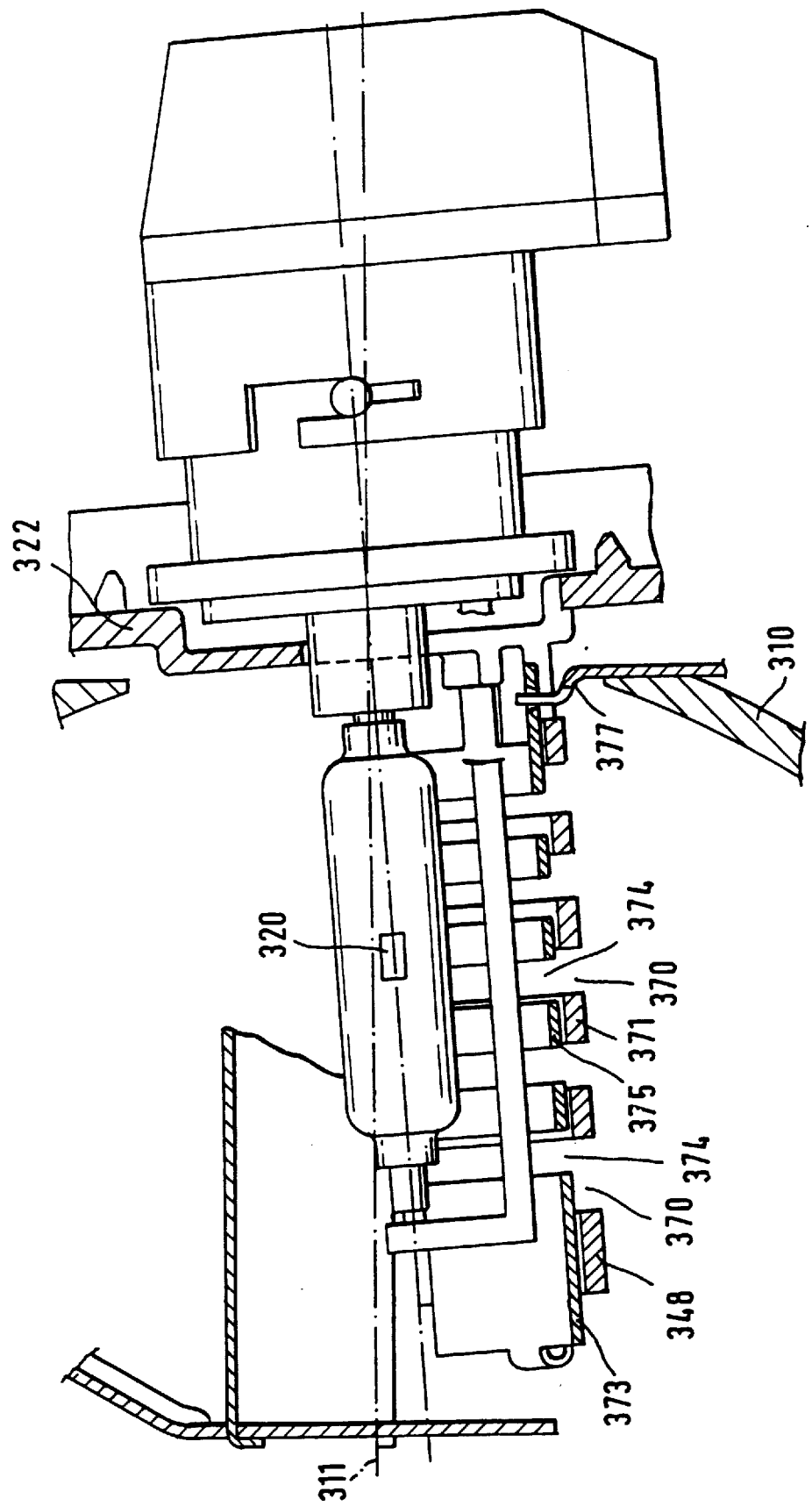

Shown in FIGS. 8 and 9 is the headlight according to a third exemplary embodiment, the headlight likewise being of fundamentally the same design as described in the case of the first exemplary embodiment and therefore essentially only the deviating features being described below. The headlight has the reflector 310 and the light source 312 which is arranged in the lamp carrier 322. The covering 321 of the light source 312 is designed to be translucent over its entire circumference. Fastened to the lamp carrier 322 is a cap 348 which projects into the reflector 310 and which surrounds the light source 312 on its lower circumferential region. In section transverse to the optical axis 311, the cap 348 can, for example, be of u-shaped design or designed in the form of a circular section. The cap 348 is designed to be opaque and has, in the direction of the optical axis 311, a plurality of slit-like openings 370 arranged one behind another, which extend over the circumference of the cap 348 as far as in the vicinity of their upper edges 344 and are separated from one another by webs 371. Arranged within the cap 348 is a slide-like insert 373 which is arranged close to the inner circumference of the cap 348 and can be moved in the longitudinal direction relative to the cap 348. The slide 373 is likewise designed to be opaque and has a plurality of slit-like openings 374, arranged one behind the other in the direction of the optical axis 311, which are separated from one another by webs 375. Together with the slide 373, the cap 348 forms a shielding device. At the end region of the slide 373, arranged towards the reflector vertex, a fixing element 377 engages with a tab in a recess transversely the optical axis 311, so that the slide 373 is fixed in one position in the direction of the optical axis 311. The fixing element 377 is designed, for example, in the form of a plate which projects on the rear of the reflector 310 beyond the edge of the opening in the vertex region of the reflector 310 and is fastened to the rear of the reflector 310 by means of a screw 378. Fastened to the reflector 310 is a beam stop 380, by means of which light which emerges from the light source 312 directly in the light exit direction 46 and not impinging on the reflector 310 is shielded.

As in the case of the first exemplary embodiment, the lamp carrier 322 is supported at its upper edge region on the carriers 328 so that it can pivot about the axis 330. At its lower edge region, the lamp carrier 322 has a threaded hole 332 into which a screw 334 is screwed, said screw having a head 336 pointing towards the rear of the reflector 310 and having a slot 338 at its other end. The actuator 342 has an electric motor 360 as drive, which is arranged with its shaft 361 horizontal and perpendicular to the optical axis 311. Connected in a rotationally fixed manner to the shaft 361 is a cam disk 362 which extends over its circumference at a variable distance from the shaft 361. Hooked in the lamp carrier 322 is a tension spring 379 which is hooked at the other end in the fixing element 377 and by means of which the head 336 of the screw 334 is held in contact with the cam disk 362. By means of screwing the screw 334 in or out, a basic setting of the position of the lamp carrier 322 and hence of the light source 312 arranged in the latter is made possible.

The arrangement according to FIGS. 8, 9, 10, 11 can also be carried out using actuators and articulation systems of FIGS. 1 and 6.

In FIG. 8, the headlight is shown in the position for low beam, in which the cam disk 362 is located in such a rotary position that the head 336 of the screw 334 is in contact with that circumferential region of the cam disk 362 which has the smallest distance from the shaft 361. In this case, the light source 312 is arranged such that its luminous body 320 is located approximately on the optical axis 311. The slide 373 is arranged in the cap 348 in such a way that its webs 375 cover the slots 370 of the cap 348, so that light emitted by the light source 312 in its lower circumferential region cannot pass through the shielding device formed by the slide 373 and the cap 348 and cannot impinge on a lower region of the reflector 310. The upper light/dark boundary of the low beam is formed by the upper edges 344 of the cap 348.

In FIG. 9, the headlight is shown in a position for high beam, in which the cam disk 362 is located in such a rotary position that the head 336 of the screw 334 contacts in a circumferential region of the cam disk 362 which is arranged at a relatively large distance from the shaft 361. In this case, the lamp carrier 322 is pivoted about the axis 330 in such a way that the luminous body 320 of the light source 312 is arranged offset in the direction of the optical axis 311 toward the reflector vertex and vertically downward in relation to the optical axis 311, in contrast with the position for low beam. The cap 348, because of its rigid connection to the lamp carrier 322, likewise executes the pivoting movement, while the slide 373 cannot be moved, as a result of the fixing element 377. The result is thus a movement of the cap 348 in relation to the slide 373, so that the slots 370 of the cap 348 are no longer covered by the webs 375 of the slide 373 in the position for high beam, but rather the slots 374 of the slide 373 align with those of the cap 348 and light emitted by the light source 312 in its lower circumferential region can pass through the slots 370, 374 and can impinge on the lower region of the reflector 310. Hence, for producing the high beam, the lower region of the reflector 310 can also be used as well.

In the case of the implementation of the head-light described above according to the third exemplary embodiment, the movement of the shielding device formed by the cap 348 and the slide 373, between its position for low beam and its position for high beam, necessarily results from the movement of the light source 312, so that no additional actuator is necessary for this. The light beams reflected by the reflector 310 or emerging from the headlight after passing through the covering pane 16 illuminate the measuring screen 50 as shown in FIGS. 2 to 5.

Figure 10:
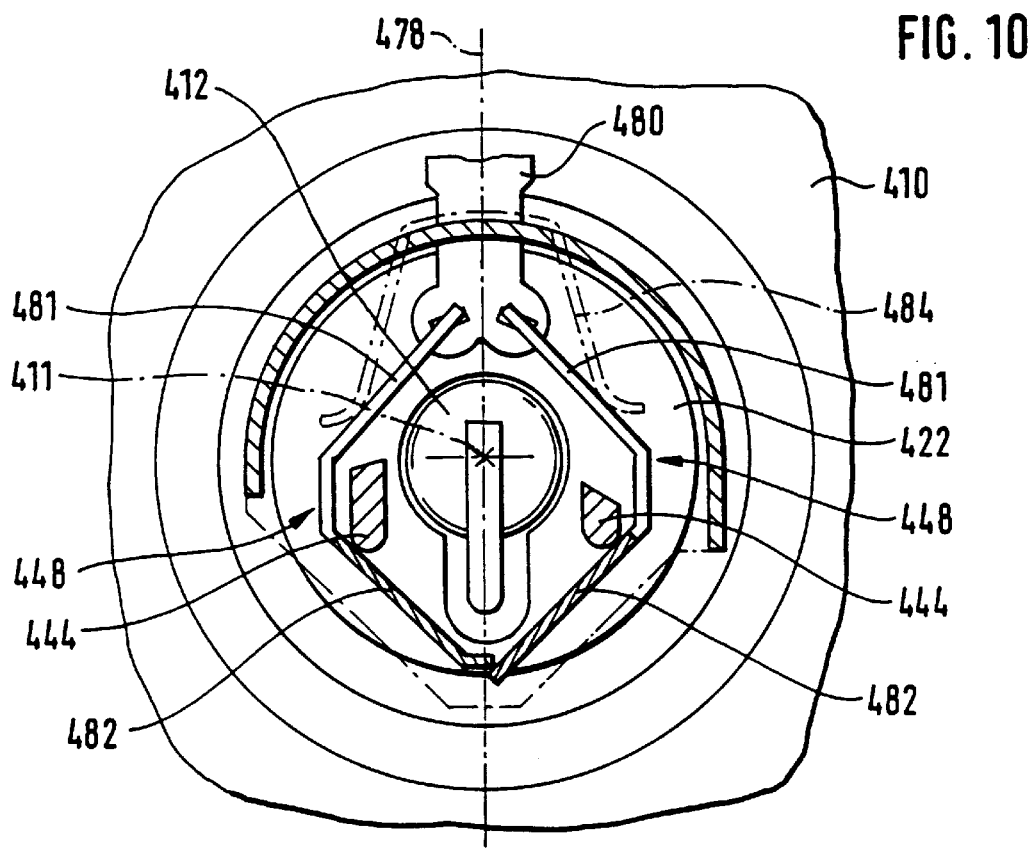
Figure 11:
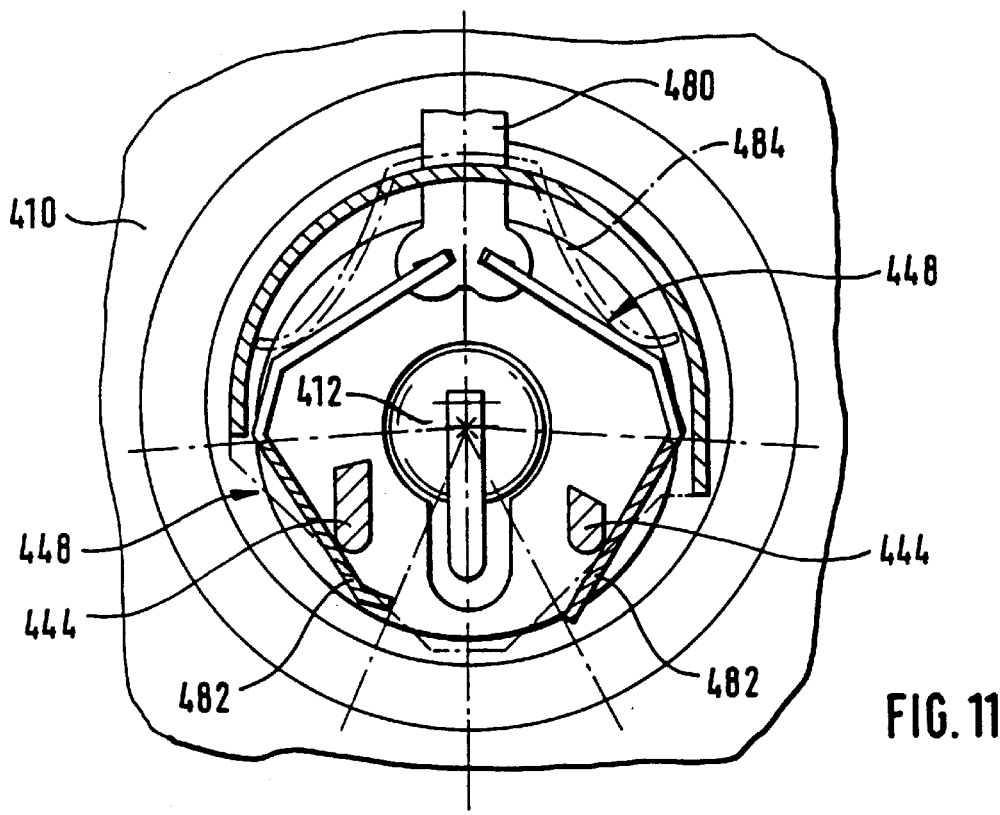

Shown in FIGS. 10 and 11 is the headlight according to a third exemplary embodiment, in relation to which only the modified shielding device will be described below. The light source 412 is arranged in the lamp carrier 422, which can be designed as in the case of one of the previously described exemplary embodiments and can be moved in a pivoting movement or, as in the case of the implementation according to FIG. 7, in a straight line between the position for low beam and the position for high beam. Serving as shielding device, by means of which in the position for low beam, light emitted by the light source 412 on its lower circumferential region is shielded, so that it cannot impinge on the lower region of the reflector 410, in the case of the headlight according to the fourth exemplary embodiment are four wing-like parts 448 which extend along the optical axis 411 and which are separated in an approximately vertical plane 478 containing the optical axis 411. The wings 448 are supported in their upper region on the reflector 410 or on a carrier 480 fastened to the reflector 410 so that they can be pivoted in each case about an axis extending approximately parallel to the optical axis 411. In their upper region, the wings 448 are designed as only narrow webs 481, so that they shield only little of the light emitted by the light source 412 in its upper circumferential region. However, in their lower region 482, the wings 448 are closed like half shells and are designed to be opaque. On the upper sides of the webs 481 of the wings 448 there acts a pretensioned, approximately C-shaped spring 484, by means of which the half shells 482 are pressed towards each other. The spring 484 is held on the carrier 480. Fastened to the lamp carrier 422, on both sides alongside the light source 412, there is in each case an opaque web 444 which extends approximately parallel to the longitudinal axis of the light source 412. The webs 444 can also be fastened to the light source 412.

In FIG. 10, the shielding device is shown in its position for low beam, in which the wings 448 contact each other with their half shells 482, acted on by the spring 484, and form a closed shell, so that light emitted by the light source 412 in its lower circumferential region cannot emerge and cannot impinge on the lower region of the reflector 410. The upper edges of the webs 444 in this case project beyond the closed lower regions of the half shells 482 and form the light/dark boundary of the low beam.

In FIG. 11, the shielding device is shown in 20 its position for high beam, in which the light source 412 and the webs 44 are arranged offset vertically downward in relation to the optical axis 411. The webs 444 in this case come to rest on the inner sides of the half shells 482 and push these apart counter to the force of the spring 484, the wings 448 pivoting about their axes with the result that an opening is exposed through which even the light emitted by the light source 412 in its lower circumferential region can emerge and can impinge on the lower region of the reflector 410. The webs 444 are then arranged in the shadow of the half shells 482.

In the case of the headlight according to the fourth exemplary embodiment, too, the shielding device formed by the two wings 448 is also necessarily likewise moved between its position for low beam and its position for high beam during the movement of the light source 412 between its position for low beam and its position for high beam, so that no separate actuator is necessary for this purpose. The light beams reflected by the reflector 410 or emerging from the headlight after passing through the covering pane 16 illuminate the measuring screen 50 as shown in FIGS. 2 to 5.

In the case of the implementations of the headlight according to FIGS. 8 to 11, the actuators and/or the dipping systems according to FIGS. 1 and 6 can also be used.

We claim:

1. A low and high beam headlight for vehicles, comprising a reflector having an optical axis; a light source; an actuator moving said light source relative to said reflector between a position for low beam and a position for high beam at least in direction of said optical axis of said reflector, said light source being additionally movable vertically relative to said optical axis of said reflector between said position for low beam and said position for high beam; and a movable shielding device cooperating with said light source so that at least in said position for low beam a part of light emitted by said light source is shield, said shielding device being moved by said actuator, said light source having at least partially translucent covering, and an opaque coating partially applied on said partially translucent covering and forming at least partially said shielding device.

2. A headlight as defined in claim 1, wherein said reflector has a vertex, said light source being movable from said position for low beam to said position for high beam in direction of said optical axis toward said vertex of said reflector.

3. A headlight as defined in claim 1, wherein said light source is movable from said position for low beam to said position for high beam vertically downwards towards said optical axis.

4. A headlight as defined in claim 1; said shielding device comprising an opaque cap which together with said opaque coating.

5. A headlight as defined in claim 1; and further comprising a lamp carrier, said light source being arranged rigidly on said lamp carrier, said actuator engaging said lamp carrier and moving said lamp carrier.

6. A headlight as defined in claim 5, wherein said cap being rigidly connected to said lamp carrier.

7. A headlight as defined in claim 5, wherein said lamp carrier is supported so as to pivot about a substantially horizontal axis relative to an optical axis of said reflector said actuator engaging said lamp carrier eccentrically relative to said axis extending substantially horizontally.

8. A headlight as defined in claim 5, wherein said lamp carrier is movable along straight line between said position for low beam and said position for high beam.

9. A headlight as defined in claim 1; and further comprising a fixed stop provided on said reflector; said actuator bringing said lamp carrier in said position for low beam into contact with said fixed stop.

10. A headlight as defined in claim 1; and further comprising a further fixed stop provided on said reflector, said actuator bringing said lamp carrier in said position for high beam into contact with said further fixed stop.

11. A headlight as defined in claim 10; and further comprising an elastically deformable intermediate element arranged between said lamp carrier and said actuator so that in at least one position of said lamp carrier said elastically deformable intermediate element is deformed in such a way that said lamp carrier is held under pretension in contact with one of said stops.

12. A headlight as defined in claim 1; and further comprising a fixed stop provided on said reflector, said actuator bringing said lamp carrier in said position for high beam into contact with said fixed stop.

13. A headlight as defined in claim 1, wherein said actuator has a drive formed as an electric motor.

14. A headlight as defined in claim 13, wherein said electric motor has a shaft; and further comprising a transmission element articulated eccentrically to said shaft of said electric motor, said electric motor being coupled to said lamp carrier through said transmission element.

15. A headlight as defined in claim 1, wherein said shielding device has two pivotable wing-like parts which in said position for low beam adjoin each other to form a continuous cap, so that light emitted by said light source toward a partial region of said reflector is shielded, at least one of said parts being movable together with said light source so that said parts are moved away from one another during movement of said light source into said position for high beam to expose an opening through which light emitted by said light source can impinge on a partial region of said reflector.

16. A headlight as defined in claim 15; and further comprising a resilient element which loads said wing-like parts towards each other to form a cap.

* * * * *